1;

United States Patent
Yang (10) Patent No.: US 9,535,799 B2
(45) Date of Patent: Jan. 3, 2017

(54) APPARATUS, SYSTEMS, AND METHODS FOR DATA RECOVERY

(71) Applicant: HGST Netherlands B.V., Amsterdam (NL)

(72) Inventor: Ken Qing Yang, Saunderstown, RI (US)

(73) Assignee: HGST Netherlands B.V., Amsterdam (NL)

( * ) Notice: Subject to any disclaimer, the term of this patent is extended or adjusted under 35 U.S.C. 154(b) by 15 days.

(21) Appl. No.: 14/590,694

(22) Filed: Jan. 6, 2015

(65) Prior Publication Data

US 2016/0196186 A1 Jul. 7, 2016

(51) Int. Cl.
*G06F 11/14* (2006.01)

(52) U.S. Cl.
CPC ....... *G06F 11/1451* (2013.01); *G06F 11/1435* (2013.01); *G06F 11/1456* (2013.01); *G06F 11/1469* (2013.01); *G06F 2201/84* (2013.01)

(58) Field of Classification Search
CPC .............. G06F 11/1435; G06F 11/1446; G06F 11/1448; G06F 11/1451; G06F 2201/84
USPC ........................................................ 711/162
See application file for complete search history.

(56) References Cited

U.S. PATENT DOCUMENTS

| | | | |
|---|---|---|---|
| 7,418,635 B2 | 8/2008 | Schulstad | |
| 7,730,347 B1 * | 6/2010 | Yang | G06F 11/1076 714/15 |
| 7,949,692 B2 | 5/2011 | Lemar et al. | |
| 8,151,060 B2 | 4/2012 | Mizushima | |
| 8,200,922 B2 | 6/2012 | McKean et al. | |
| 8,645,647 B2 | 2/2014 | Sasson et al. | |
| 8,700,842 B2 | 4/2014 | Dinker | |
| 2010/0023716 A1 * | 1/2010 | Nemoto | G06F 11/1451 711/162 |
| 2010/0100698 A1 * | 4/2010 | Yang | G06F 11/1451 711/162 |
| 2013/0282999 A1 | 10/2013 | Bennett | |
| 2014/0059279 A1 | 2/2014 | He et al. | |
| 2014/0173177 A1 | 6/2014 | Benhase et al. | |
| 2014/0281307 A1 * | 9/2014 | Peterson | G06F 3/065 711/162 |

OTHER PUBLICATIONS

Lee, et al., "A Case for Flash Memory SSD in Enterprise Database Applications", SIGMOD '08: Proceedings of the 2008 ACM SIGMOD International Conference on Management of Data, pp. 1075-1086, 12 pages.

* cited by examiner

*Primary Examiner* — Gary Portka
(74) *Attorney, Agent, or Firm* — Wilmer Cutler Pickering Hale and Dorr LLP (57) ABSTRACT

The embodiments disclosed herein provide a flash aware snapshot technique for two-way data recovery and back-in-time execution. The disclosed snapshot technique is designed to reduce the number of write operations to improve the performance on flash-based storage systems. The disclosed snapshot technique can guarantee data recovery no matter which of the production site or the backup site fails. The disclosed snapshot technique can also reduce the storage space requirement for snapshots by exploiting content locality. Furthermore, the disclosed snapshot technique can be implemented using hardware, software, firmware, or any combination of them. In case of hardware implementation, only minor hardware modifications are needed.

20 Claims, 9 Drawing Sheets

APPARATUS, SYSTEMS, AND METHODS FOR DATA RECOVERY

FIELD OF DISCLOSURE

The present disclosure relates to apparatus, systems, and methods for providing data recovery.

BACKGROUND

Solid state drives can include non-volatile solid-state memory, such as flash memory. Flash memory can include an improved form of Electrically-Erasable Programmable Read-Only Memory (EEPROM). Traditional EEPROM devices are only capable of erasing or writing one memory location (e.g., a memory cell) at a time. In contrast, flash memory allows multiple memory locations to be erased or written in one programming operation. Flash memory can thus operate at a higher speed compared to traditional EEPROM.

Solid-state memory has a number of advantages over other storage devices. For example, it generally offers faster read access times and better shock resistance than a hard disk drive (HDD). Unlike dynamic random access memory (DRAM), solid-state memory is generally non-volatile, meaning that data stored in flash memory is not lost when power to the memory is removed. These advantages, and others, may explain the increasing popularity of flash memory for storage applications in devices such as memory cards, USB flash drives, mobile phones, digital cameras, mass storage devices, MP3 players and the like. As with any storage systems, data stored in flash memory may be prone to various forms of undesired destruction. Traditional techniques for preventing data loss include file versioning or data backup to a remote server.

Data protection and recovery is an important feature of any storage systems. Data stored in storage systems can be inadvertently lost through a variety of unforeseen events, such as storage hardware failures and power outage. Also, data can be prone to hacks and virus attacks from third parties, and even unintended instructions from authorized users (e.g., unintended "delete" instruction.) Therefore, it is important to protect data from such unforeseen events and allow computing systems to go back to a healthy state after such events and perform back-in time execution (BITE) to rerun transactions for fault, failed, and/or incomplete transactions.

Storage systems can perform data protection and recovery using snapshots. A snapshot is a collection of data maintained by a storage system at a particular time instance. A storage system that uses snapshots for data recovery can maintain two storage volumes: a source volume and a snapshot volume. Depending on the snapshot technique, as discussed below, the source volume can maintain the actual current data in use and the snapshot volume can maintain the snapshot data for recovering data in case of data loss in the source volume. In some cases, the source volume can reside at a production site (which may include a server host and a production storage device), and the snapshot volume can reside at a production site or a backup site (which may include a backup server and a backup storage device) or both. The production site and the backup site are connected to one another by a communication system such as a network.

In some cases, a storage system can protect against data loss using a full-clone snapshot. A full-clone snapshot includes a copy of the entire data maintained by a storage system at a particular time instance. While a full-clone snapshot is effective in recovering data as maintained at the particular time instance, the full-clone snapshot is time-consuming to generate and space-consuming to store. Therefore, a storage system may generate the full-clone snap shot only periodically, for example, weekly, daily or hourly depending on reliability and performance requirement.

In some cases, a storage system can generate and maintain a copy-on-write (COW) snapshot. The COW snapshot of a particular time instance includes an image of memory blocks whose values have changed since the last COW snapshot was taken or declared. For example, when a memory controller receives a write request for a memory block for the first time after a snapshot is declared, the memory controller can cause a copy of prior data to be made in the snapshot volume. Therefore, when a memory block is overwritten for the first time after a snapshot is declared, the storage system performs two write operations and one read operation: one read operation for reading the prior data from the source volume, one write operation for writing the prior data in the snapshot volume, and one write operation for writing the new data in the source volume. The COW snapshot allows data to be recovered to snapshot time instances (e.g., time instances at which the snapshot is declared), and can save storage space and back-up time compared to full-clone snapshots.

In some cases, a storage system can generate and maintain a redirect-on-write (ROW) snapshot. The ROW snapshot is similar to a COW snapshot. However, when a memory controller receives write requests for a memory block after a snapshot is declared, the memory controller redirects them to a snapshot volume, leaving the memory block in the source volume intact. Therefore, the source volume keeps data as maintained at the snapshot time instance (e.g., the time instance at which the snapshot was declared); and the snapshot volume maintains changes to the memory blocks in the source volume since the snapshot time instance. Unlike the COW scheme, under the ROW scheme, the memory controller does not need to perform a separate copy operation to copy the prior data from the source volume to the snapshot volume, thereby reducing the number of write operations performed by the memory controller. However, under the ROW scheme, the memory controller does need to merge memory blocks upon receiving a read request. For example, when a memory controller receives a read request, the memory controller should determine whether the requested data is stored in the source volume or the snapshot volume.

Because COW snapshots and ROW snapshots can be generated easily, the COW and ROW snapshot operations can be performed more frequently compared to the full-clone snapshot operation. Furthermore the COW snapshots and ROW snapshots often require smaller storage space compared to the full-clone snapshot because the COW snapshots and ROW snapshots store only memory blocks that have changed value since the last snapshot time instance.

For data recovery, the snapshots can be located at either the backup site or the production site (or both). As long as the snapshots can be retrieved reliably, the actual location of the snapshots is of lesser importance because data recovery often does not require low latency. For this reason, full-clone snapshots are often stored at a backup site because full-clone snapshots tend to require a large storage space and such a large storage space may be too expensive to accommodate at the production site. Also, backup sites are often more reliable and secure than the production site. Therefore, full-clone snapshots can be stored more reliably at the backup site. Because the COW snapshots and ROW snapshots need smaller space to store, they can be stored at both the production site and the backup site for data recovery purposes.

For back-in-time execution (BITE) (e.g., execution of a transaction based on data that was present at the snapshot time instance), the location of the snapshot can become important because in general, BITE often requires low latency. Therefore, to accommodate BITE, it is desirable to store the snapshots at the production site. Unfortunately, because the full-clone snapshots often require a large storage space, it is difficult to store the full-clone snapshots at the production site. However, since the COW snapshots and ROW snapshots only require small storage space, maintaining COW snapshots and ROW snapshots at the production site is feasible. Therefore, storage systems can store COW snapshots and ROW snapshots at the production site to facilitate BITE.

In some cases, a storage system could use two or more full-clone snapshots, a COW snapshot, and/or a ROW snapshot to improve the data recovery performance and the BITE performance. However, a storage system is limited by the storage capacity dedicated to the snapshots. Therefore, a storage system is designed to improve the data recovery performance and the BITE performance with the constraint on the available storage capacity for snapshots.

Even with the use of multiple snapshots, traditional snapshot schemes do not readily guarantee data recovery when the backup site is down. This is problematic because the backup site is not fail-proof. For example, the backup site is usually located at a data center. When the data center is experiencing a power outage, then the snapshots stored in the data center may not be available for restoring lost data at the production site.

Also, snapshot techniques for flash-based storage systems is further constrained by the fact that write operations in flash devices are expensive. Flash-based storage systems often strive to reduce the number of write operations. Therefore, there is a need for snapshot techniques for flash-based storage systems designed to reduce the number of write operations for storing snapshots and recovering data based on the snapshots.

SUMMARY

Embodiments of the present disclosure relate to apparatus, systems, and methods for providing wear leveling in solid state devices.

In one aspect, the present disclosure relates to a system. The system includes one or more storage devices comprising a first memory block and a second memory block configured to maintain data, wherein the first memory block comprises a prior snapshot and the second memory block comprises a current snapshot of data stored in the first memory block. The system also includes an interface configured to provide communication with a remote storage device. The system also includes a memory controller in communication with the one or more storage devices and the interface, the memory controller configured to: receive the prior snapshot and the current snapshot from the one or more storage devices; perform a commutative binary operator on the prior snapshot and the current snapshot to generate a combined snapshot; and cause the combined snapshot to be stored in the one or more storage devices and the remote storage device, wherein the combined snapshot can be used to recover any lost data when the one or more storage devices or the remote storage device is inoperative.

In some embodiments, the commutative binary operator comprises an exclusive OR operator.

In some embodiments, the remote storage device is configured to maintain a full-clone snapshot of the one or more storage devices for a first time instance, a first combined snapshot of a second time instance, and a second combined snapshot of a third time instance, wherein the one or more storage devices is configured to maintain data associated with the third time instance, the first combined snapshot of the second time instance, and the second combined snapshot of the third time instance.

In some embodiments, the memory controller is caused to recover data for the second time instance when the remote storage device is inoperative. To this end, the memory controller is configured to retrieve the second combined snapshot of the third time instance from the one or more storage devices, wherein the second combined snapshot is indicative of at least one memory block that has changed value between the second time instance and the third time instance; perform an inverse commutative binary operator on the second combined snapshot of the third time instance and the at least one memory block of the data associated with the third time instance to recover a prior snapshot of the third time instance; and substitute the at least one memory block of the data based on the prior snapshot of the third time instance to recover the data for the second time instance.

In some embodiments, the memory controller is caused to recover data for the second time instance when the one or more storage devices is inoperative. To this end, the memory controller is configured to retrieve the combined snapshot of the first time instance and the full-clone snapshot of the first time instance from the remote storage device, wherein the combined snapshot is indicative of at least one memory block that has changed value between the first time instance and the second time instance; perform an inverse commutative binary operator on the combined snapshot of the first time instance and the at least one memory block of the full-clone snapshot of the first time instance to recover a current snapshot of the second time instance; and substitute the at least one memory block of the full-clone snapshot of the first time instance based on the current snapshot of the second time instance to recover the data for the second time instance.

In some embodiments, the memory controller is configured to index the prior snapshot using a flash translation layer that associates a logical block address and a physical memory location.

In some embodiments, the memory controller is configured to index the current snapshot using a mapping table.

In some embodiments, the one or more storage devices comprises flash memory and the one or more storage devices are arranged in a redundant array configuration.

In some embodiments, the remote storage device resides in a data center and the memory controller is configured to communicate with the remote storage device using the interface over the Internet.

In one aspect, the present disclosure relates to a method. The method includes receiving, by a memory controller, a prior snapshot of a first memory block and a current snapshot of the first memory block; performing, by the memory controller, a commutative binary operator on the prior snapshot and the current snapshot to generate a combined snapshot; and causing, by the memory controller, the combined snapshot to be stored in the one or more storage devices and the remote storage device, wherein the combined snapshot can be used to recover any lost data when the one or more storage devices or the remote storage device is inoperative.

In some embodiments, the commutative binary operator comprises an exclusive OR operator.

In some embodiments, the method includes maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance.

In some embodiments, the method includes retrieving the second combined snapshot of the third time instance from the one or more storage devices, wherein the second combined snapshot is indicative of at least one memory block that has changed value between the second time instance and the third time instance; operating an inverse commutative binary operator on the second combined snapshot of the third time instance and the at least one memory block of the data for the third time instance to recover a prior snapshot of the third time instance; and substituting the at least one memory block of the data for the third time instance based on the prior snapshot of the third time instance to recover the data for the second time instance.

In some embodiments, the method includes retrieving the combined snapshot of the first time instance and the full-clone snapshot of the first time instance from the remote storage device, wherein the combined snapshot is indicative of at least one memory block that has changed value between the first time instance and the second time instance; operating an inverse commutative binary operator on the combined snapshot of the first time instance and the at least one memory block of the full-clone snapshot of the first time instance to recover a current snapshot of the second time instance; and substituting the at least one memory block of the full-clone snapshot of the first time instance based on the current snapshot of the second time instance to recover the data for the second time instance.

In some embodiments, the method includes indexing the prior snapshot using a flash translation layer that associates a logical block address and a physical memory location.

In some embodiments, the method includes indexing the current snapshot using a mapping table.

In one aspect, the present disclosure relates to a computer program product comprised of a series of instructions executable on a computer. The computer program product is capable of implementing the steps of receiving, by a memory controller, a prior snapshot of a first memory block and a current snapshot of the first memory block; performing, by the memory controller, a commutative binary operator on the prior snapshot and the current snapshot to generate a combined snapshot; and causing, by the memory controller, the combined snapshot to be stored in the one or more storage devices and the remote storage device, wherein the combined snapshot can be used to recover any lost data when the one or more storage devices or the remote storage device is inoperative.

In some embodiments, the computer program product is further capable of implementing the step of maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance.

In some embodiments, the computer program product is further capable of implementing the steps of retrieving the second combined snapshot of the third time instance from the one or more storage devices, wherein the second combined snapshot is indicative of at least one memory block that has changed value between the second time instance and the third time instance; operating an inverse commutative binary operator on the second combined snapshot of the third time instance and the at least one memory block of the data for the third time instance to recover a prior snapshot of the third time instance; and substituting the at least one memory block of the data for the third time instance based on the prior snapshot of the third time instance to recover the data for the second time instance.

In some embodiments, the computer program product is further capable of implementing the steps of retrieving the combined snapshot of the first time instance and the full-clone snapshot of the first time instance from the remote storage device, wherein the combined snapshot is indicative of at least one memory block that has changed value between the first time instance and the second time instance; operating an inverse commutative binary operator on the combined snapshot of the first time instance and the at least one memory block of the full-clone snapshot of the first time instance to recover a current snapshot of the second time instance; and substituting the at least one memory block of the full-clone snapshot of the first time instance based on the current snapshot of the second time instance to recover the data for the second time instance.

BRIEF DESCRIPTION OF THE FIGURES

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labeled in every figure. Nor is every component of each embodiment of the disclosed subject matter shown where illustration is not necessary to allow those of ordinary skill in the art to understand the disclosed subject matter.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The embodiments disclosed herein provide a flash aware snapshot technique for data recovery and BITE. The disclosed flash aware snapshot technique is designed to reduce the number of write operations to improve the performance of flash-based storage systems. The disclosed flash aware snapshot technique can guarantee data recovery no matter which of the production site or the backup site fails.

The disclosed flash aware snapshot technique can also reduce the storage space requirement for snapshots by exploiting content locality. More particularly, the disclosed flash aware snapshot technique can compress the data in memory blocks that are expected to have a large number of zero bits. This way, the snapshots that result from the memory blocks can be expected to have smaller footprint.

Furthermore, the disclosed flash aware snapshot technique can be implemented with only minor hardware modifications. The disclosed technique uses simple logic gates, such as exclusive or (XOR) gates, to generate snapshots. These logic gates are common place in today's storage controllers. Therefore, the disclosed technique can be implemented with the existing hardware support in the storage controllers.

Figure 1:
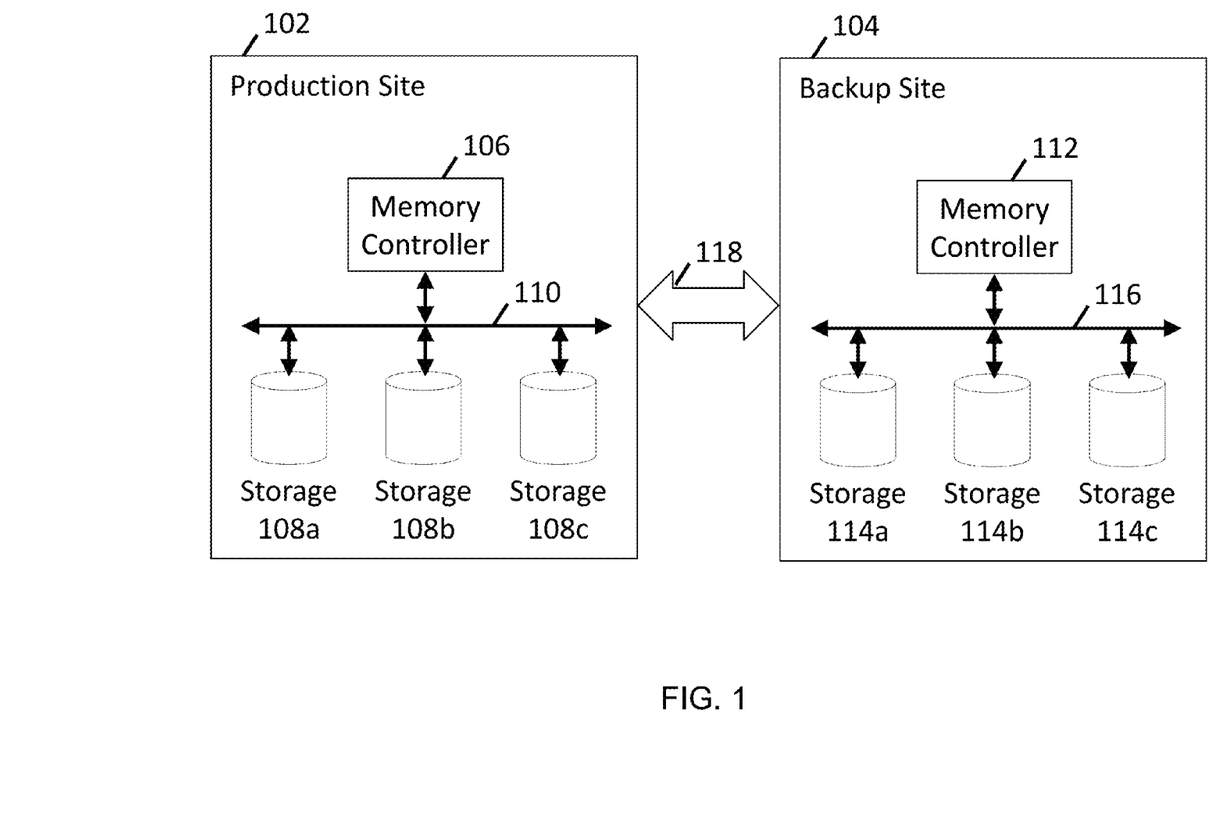
FIG. 1 illustrates an exemplary storage system in accordance with some embodiments of the present disclosure.

FIG. 1 illustrates an exemplary storage system in accordance with some embodiments of the present disclosure. The storage system 100 can include a production site 102 and a backup site 104. The production site 102 can include a memory controller 106 and a production storage devices 108a-108c. The memory controller 106 and the production storage devices 108a-108c can communicate via a bus 110. The bus 110 can include, for example, PCI, PCI-Express, PCI-X, InfiniBand, HyperTransport, SCSI PCI-E card, SATA PCI-E card, iSCSI adaptor card, or Fibre Channel PCI-E card. Likewise, the backup site 104 can include a memory controller 112 and a backup storage devices 114a-114c. The memory controller 112 and the production storage devices 114a-114c can communicate via a bus 116. The bus 116 can include, for example, PCI, PCI-Express, PCI-X, InfiniBand, HyperTransport, SCSI PCI-E card, SATA PCI-E card, iSCSI adaptor card, or Fibre Channel PCI-E card. In some embodiments, the backup site 104 is a part of a data center that includes a plurality of servers and a plurality of storage devices.

The production site 102 and the backup site 104 can communicate via a communication network 118. The communication network 118 can include the Internet, a local area network (LAN), a packet data network, a legacy network, or any type of network that is capable of providing data communication between the production site 102 and the backup site 104.

In some embodiments, a memory controller 106, 112 is implemented in hardware. The hardware can include logic circuits and/or memory for selecting target memory blocks and for evicting data from the selected target memory blocks to accommodate new data. In some embodiments, the hardware for the memory controller 106, 112 can be implemented using a hardware description language including Verilog, VHSIC hardware description language (VHDL), and BlueSpec™ (Bluespec Inc., Framingham, Mass.), and be synthesized using logic synthesis tools including Design Compiler® (Synopsis Inc., Mountain View, Calif.), Encounter RTL compiler (Cadence Design Systems Inc., San Jose, Calif.), RealTime Designer (Oasys Design Systems, Inc., Santa Clara, Calif.), and BooleDozer (International Business Machine, Endicott, N.Y.).

In some embodiments, a memory controller 106, 112 is implemented as a part of firmware. In some embodiments, the memory controller 106, 112 can be implemented in software using memory such as a non-transitory computer readable medium, a programmable read only memory (PROM), or flash memory. The software can run on a processor, which may reside in the memory controller 106, 112, which executes instructions or computer code, which can be embodied in a non-transitory computer readable medium embodied in the memory controller 106, 112.

In some embodiments, the production storage devices 108a-108c and the backup storage devices 114a-114c can be implemented using a non-volatile storage device. The non-volatile storage device can include a flash memory, a non-volatile RAM (NVRAM), a micro-electromechanical systems (MEMS) storage, or a battery backed dynamic random access memory (DRAM). In some embodiments, the production storage devices 108a-108c and the backup storage devices 114a-114c can be arranged as a redundant disk array, similarly to a redundant array of inexpensive disks (RAID) configuration.

The disclosed snapshot technique is described in terms of ROW snapshots. The ROW snapshot scheme does not require copying the prior data in the source volume to the snapshot volume, which reduces the number of write operations associated with the ROW snapshot scheme. The embodiments disclosed herein are based on the ROW snapshot scheme. However, one of ordinary skill in the art may modify the embodiments to accommodate a COW snapshot scheme.

In some embodiments, the memory controller 106 is configured to generate a ROW snapshot. For example, once the snapshot is declared, the memory controller 106 can maintain (i.e., index) a set of memory blocks that are overwritten since the snapshot time instance: a time instance at which the snapshot is declared.

In some embodiments, the memory controller 106 can represent the overwritten memory blocks using a prior snapshot representation or a current snapshot representation (or both). A prior snapshot includes a set of memory blocks that have values as were present at the snapshot time instance. The union of (1) the prior snapshot and (2) all unchanged memory blocks form a complete data image as of the snapshot time instance. In contrast, a current snapshot includes a set of memory blocks that have newest values since the snapshot time instance. The union of (1) the current snapshot and (2) all unchanged memory blocks form a complete, current data image.

Figure 2:
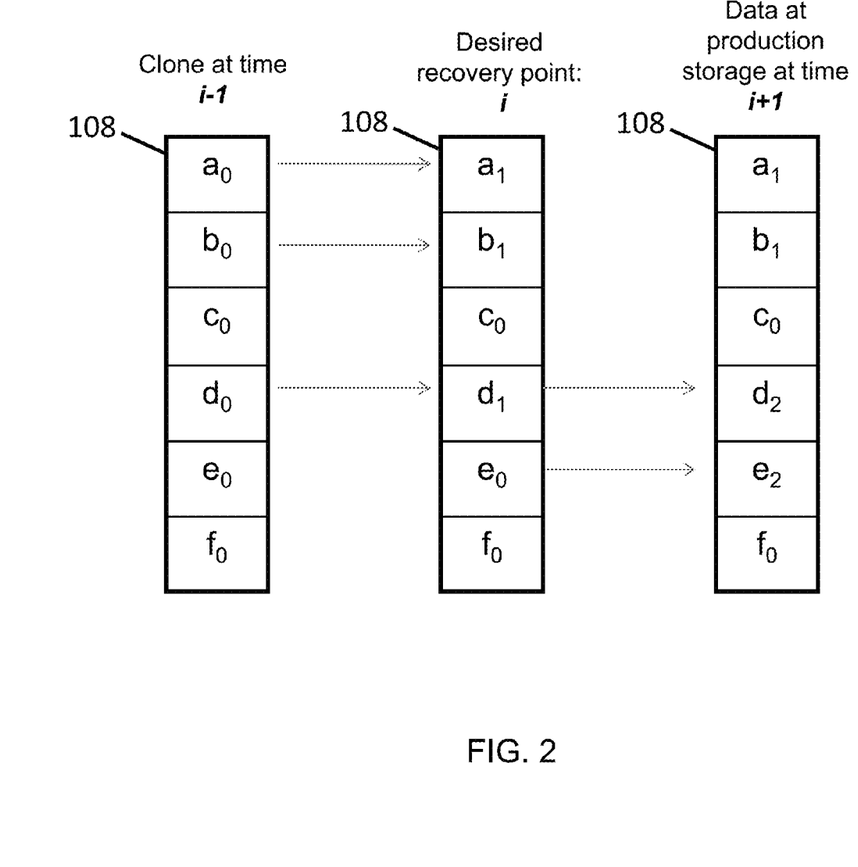
FIG. 2 illustrates an exemplary scenario in which data stored in a production storage device changes over time in accordance with some embodiments.

FIG. 2 illustrates an exemplary scenario in which data stored in a production storage device changes over time in accordance with some embodiments. FIG. 2 illustrates three time instances: the time instance i−1 at which the full-clone snapshot is created and stored in the backup storage device 114; the time instance i, which is a desired recovery point (as discussed further below); and the time instance i+1, which indicates the current time instance. Each slot in the production storage device 108 indicates a memory block. The memory block can correspond to a page or a subset of a page. In this example, between the time instance i−1 and the time instance i, three memory blocks changed values from $a_0$, $b_0$, $d_0$ to $a_1$, $b_1$, $d_1$, respectively. Also, between the time instance i and the time instance i+1, two memory blocks changed values from $d_1$, $e_0$ to $d_2$, $e_2$, respectively. In this case, the prior snapshot at time instances i and i+1 are as follows:

$$PS_i = \{a_0, b_0, d_0\}, PS_{i+1} = \{d_1, e_0\}$$

Also, the current snapshot at time instances i and i+1 are as follows:

$$CS_i = \{a_1, b_1, d_1\}, CS_{i+1} = \{d_2, e_2\}$$

In some embodiments, the memory controller 106 can index the prior snapshots using a subset of a flash translation layer (FTL) table with some additional timing and status information. The FTL table is configured to provide a mapping between a logical block address and a physical flash storage media. For example, the time when the page was last changed and whether the page is consistent with the backing store if the SSD is used as a cache using a dirty bit as status information. In some embodiments, the memory controller 106 can index the current snapshots using a mapping table formed after a snapshot is declared. The mapping table can have a size that is proportional to the number of blocks that have changed values. In some cases, the size of the mapping table can grow as the number of blocks that have changed values increases.

As discussed earlier, the disclosed snapshot technique can be used for data protection and recovery and BITE. To this end, the memory controller 106 is configured to cause a snapshot to be stored at both the production site 102 and the backup site 104. However, keeping both the prior snapshot and the current snapshot at both the production site 102 and the backup site 104 would unlikely be an option because of storage space constraints. Therefore, the memory controller 106 is configured to cause the production site 102 and the backup site 104 to maintain only one type of snapshot.

To determine which snapshot should be maintained at both the production site 102 and the backup site 104, the properties of the prior snapshot and the current snapshot are analyzed below.

Figure 3A:
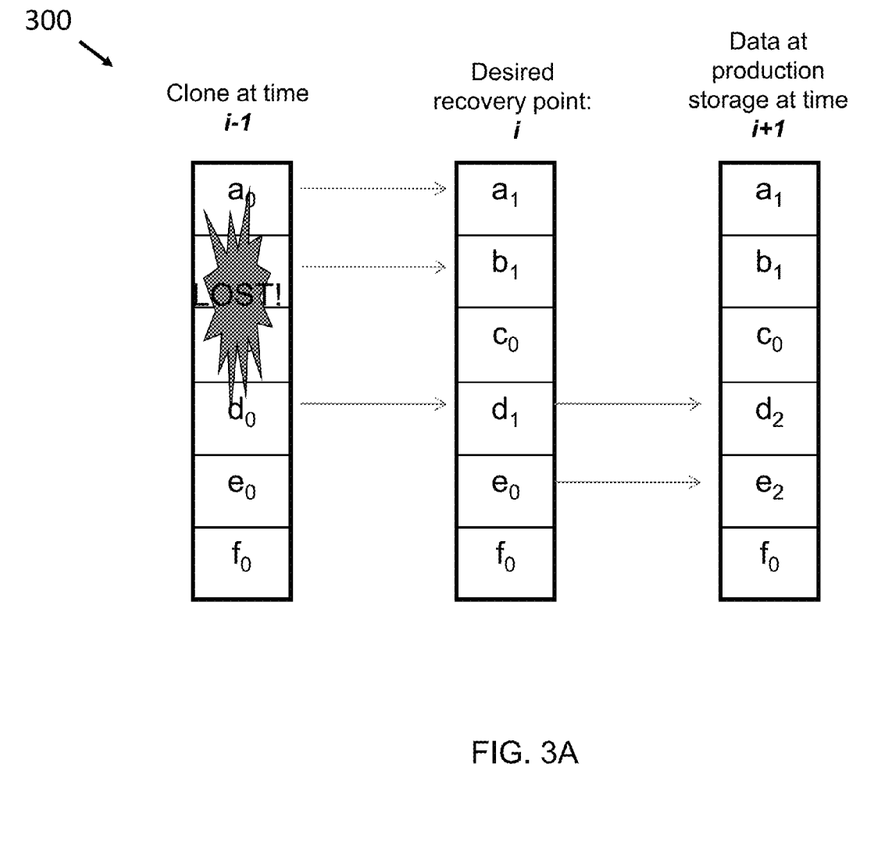
FIGS. 3A-3B illustrate a scenario in which the prior snapshot is used for data recovery in accordance with some embodiments.
Figure 3B:
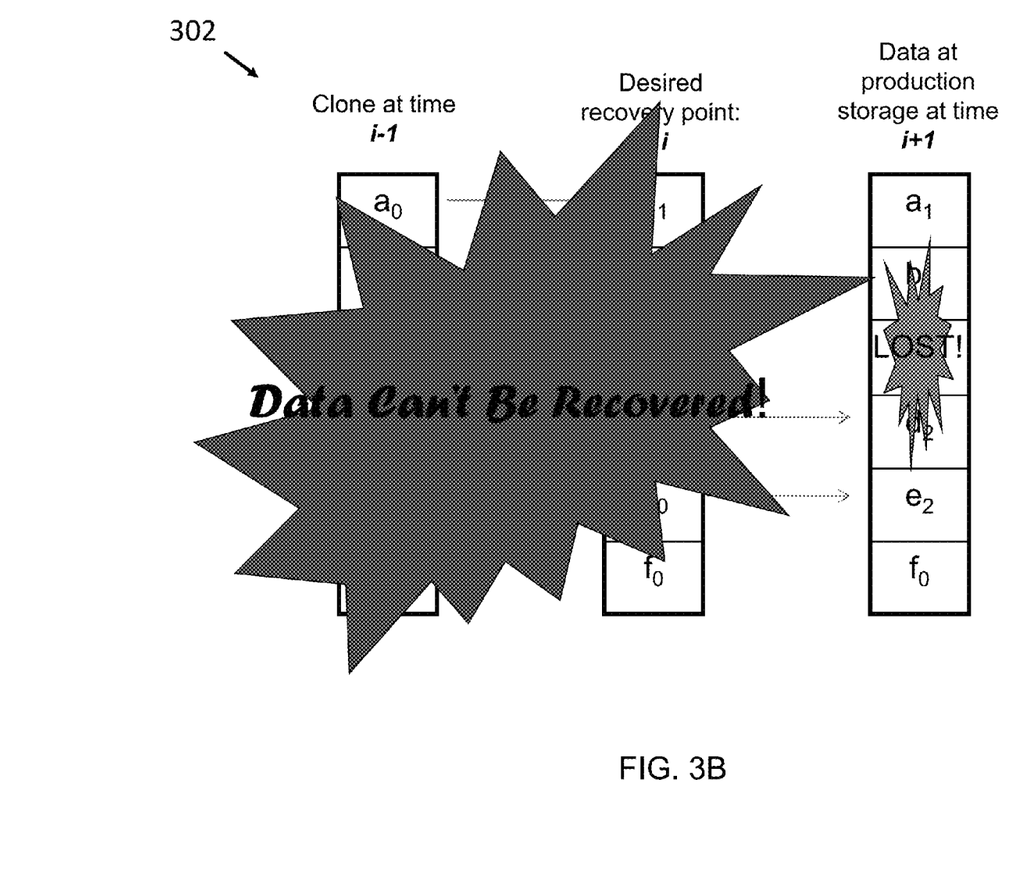

FIGS. 3A-3B illustrate a scenario in which the prior snapshot is used for data recovery in accordance with some embodiments. In this scenario, the memory controller 106 is configured to restore the data to the time instance i based on the full-clone snapshot at the time instance i−1 and prior snapshots at time instances i and i+1. To this end, the memory controller 106 can substitute values in the current production storage device, identified as D(i+1), as follows:

$$D(i+1) <= PS(i+1)$$

Once the substitution is completed, the data remaining in the current production storage device D(i+1) is identical to the data stored at the time instance i, thereby completing the data recovery process. Because the substitution operation does not actually require the full-clone snap shot from the time instance i−1, the data recovery to the time instance i can be performed even if the backup site 104 is down.

However, as illustrated in FIG. 3B, when the production site 102 is down, the data in the current production data storage D(i+1) is not available. Because data recovery to the time instance i requires the data D(i+1), data recovery to the time instance i is not feasible when the production site 102 is down. Put another way, the prior snapshot can perform data recovery to the time instance i only when the production site 102 is functioning properly. Therefore, the memory controller 106 cannot guarantee data recovery to the time instance i simply by storing the prior snapshot at both the production site 102 and the backup site 104.

Figure 4A:
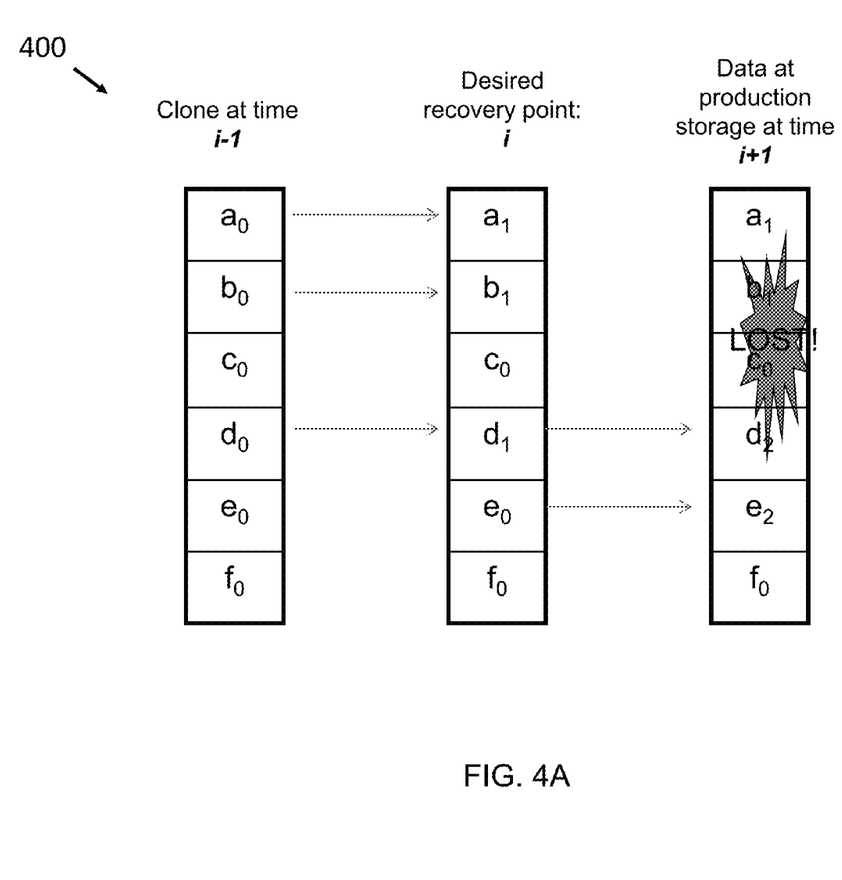
FIGS. 4A-4B illustrate a scenario in which the current snapshot is used for data recovery in accordance with some embodiments.
Figure 4B:
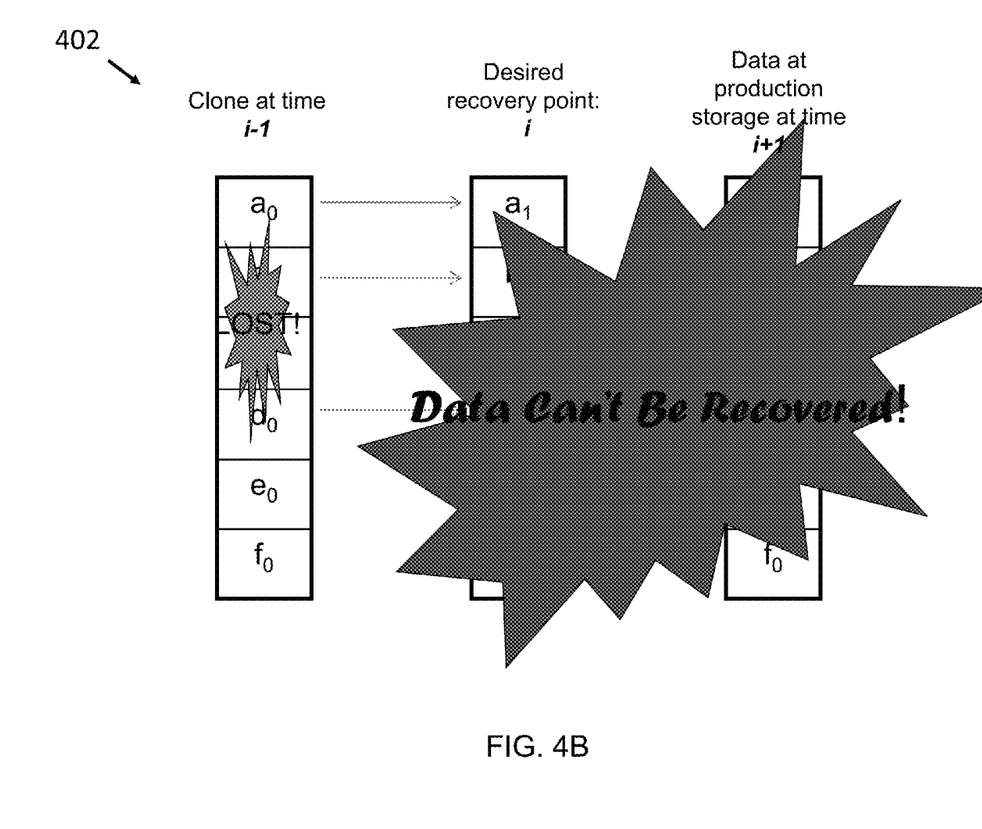

FIGS. 4A-4B illustrate a scenario in which the current snapshot is used for data recovery in accordance with some embodiments. In this scenario, the memory controller 106 is configured to restore the data to the time instance i based on the full-clone snapshot at the time instance i−1 and current snapshots at time instances i and i+1. To this end, the memory controller 106 can substitute values in the full-clone snapshot, identified as D(i−1), as follows:

$$D(i-1) <= CS(i)$$

Once the substitution is completed, the data remaining in the full-clone snapshot D(i−1) is identical to the data stored at the time instance i, thereby completing the data recovery process. Because the substitution operation does not actually require the data currently stored in the production storage device 108, the data recovery to the time instance i can be performed even if the production site 102 is down.

However, as illustrated in FIG. 4B, when the backup site 104 is down, the data in the full-clone snapshot D(i−1) is not available. Because data recovery to the time instance i requires the data D(i−1), data recovery to the time instance i is not feasible when the backup site 104 is down. Put another way, the current snapshot can perform data recovery to the time instance i only when the backup site 104 is functioning properly. Therefore, the memory controller 106 cannot guarantee data recovery to the time instance i simply by storing the current snapshot at the production site 102 and the backup site 104.

FIGS. 3-4 illustrate that neither the prior snapshot nor the current snapshot is by itself capable of guarantying data recovery to the time instance i. The shortcomings of the prior snapshot and the current snapshot can be addressed by storing both the prior snapshot and the current snapshot at the production site 102 and the backup site 104. However, this can increase the storage space overhead associated with snapshots.

These properties can be analyzed analytically. $F_t$ denotes a function that identifies data stored in a data storage at time t. The function can be defined as $F_t: A \times D$, where A is a set of logical block address of a data stored in a data storage, and D is a set of all possible data values contained in memory blocks. For example, when a data storage has a set of memory blocks $a_1, \ldots, a_N$, and each memory block maintains $d_1, \ldots, d_N$, respectively, then a data storage can be represented as the following set: $\{(a_1, d_1), \ldots, (a_N, d_N)\}$. In this case, $F_t(a_1) = d_1$. Also, the operator "/" is a set restriction operator. For example, $F_t/A'$ is a restriction of $F_t$ to $A'$ if $A' \subseteq A$. $F_t/A'$ can also be represented as follows: $F_t/A' = F_t \cap (A' \times D)$.

Figure 5:
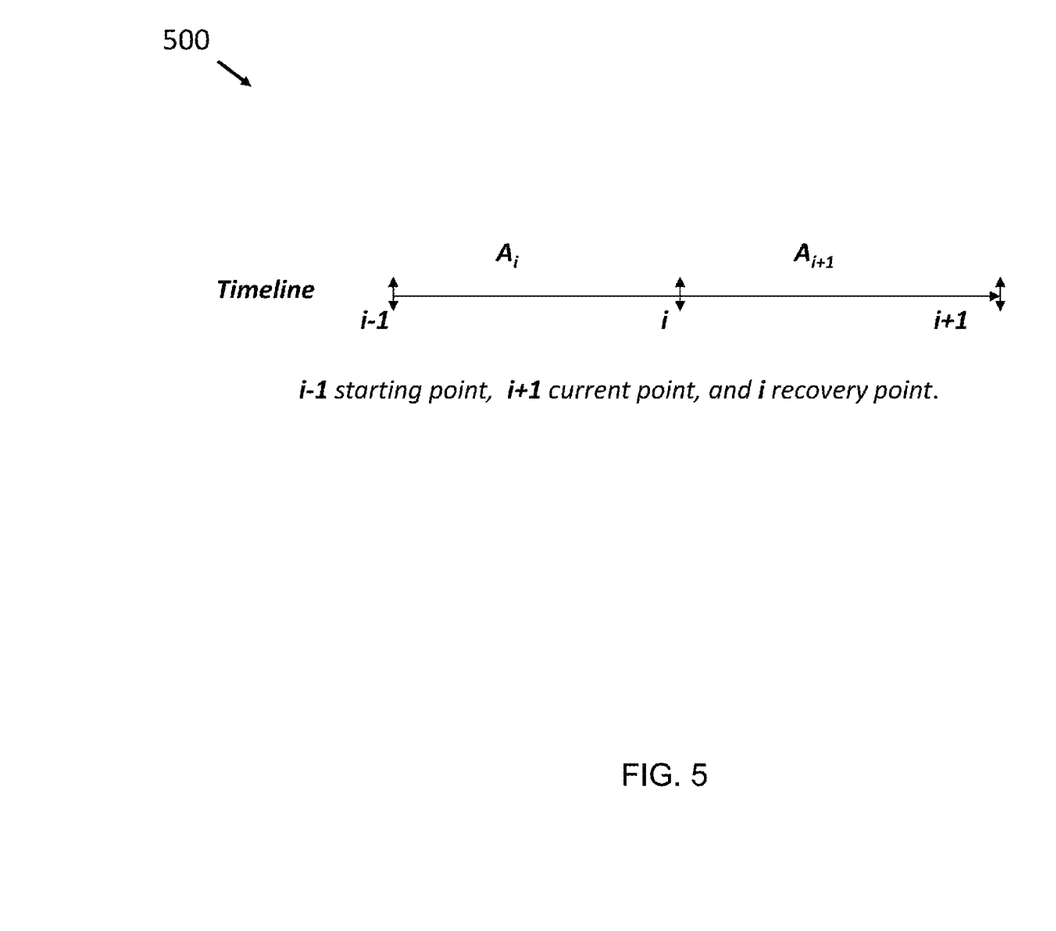
FIG. 5 provides a timeline based on which snapshots are described in accordance with some embodiments.

To facilitate the analysis, several variables are defined as follows. FIG. 5 provides a timeline 500 based on which snapshots are described in accordance with some embodiments. As in FIGS. 2-4, i−1 denotes a time instance at which the full-clone snapshot is created and stored in the backup storage device 104; i denotes a time instance that is a desired recovery point; and i+1 denotes the current time instance.

Definition 1. Let $A_i \subseteq A$ be a set of logic block addresses (LBAs). $A_i$ is a write set i if it contains all LBAs whose data values have been overwritten between the time instance i−1 and the time instance i.

Definition 2. Let $A'_i \subseteq A$ be a substantial write set i if the data value of every LBA in $A'_i$ has been changed between the time instance i−1 and the time instance i.

Definition 3. A prior snapshot at the time instance i+1 with the snapshot time instance of i, can be written as $F_i/A_{i+1}$, where $A_{i+1}$ is write set i+1.

Based on these definitions, following results can be derived. When the memory controller 106 has access to the full data set $F_{i+1}$ at the time instance i+1 and the prior snapshot $F_i/A_{i+1}$, then the memory controller 106 can recover the full data set $F_i$ at the time instance i as follows:

$$F_i = (F_{i+1} - F_{i+1}/A_{i+1}) \cup F_i/A_{i+1}$$

where "−" and "∪" are difference and union operators of sets, respectively. This process 300 is illustrated in FIG. 3A.

When the full data set $F_{i+1}$ at the time instance i+1 is not available, the substantial write set $A'_i$ is not empty ($A'_i \neq \emptyset$), and $A'_i \subseteq A_{i+1}$, the COW prior snapshot cannot recover the full data set $F_i$ at the time instance i, as shown by the process 302 illustrated in FIG. 3B.

Definition 4. The current snapshot (also known as an incremental backup) as seen at time instance i for a snapshot time instance of i−1 is defined as $F_i/A_i$.

Based on these definitions, following results can be derived. When the memory controller 106 has access to the full-clone snapshot $F_{i-1}$ at time instance i−1 and the current snapshot $F_i/A_i$ as seen at time instance i with the snapshot time instance of i−1, then the memory controller 106 can recover the full data set $F_i$ at the time instance i as follows:

$$F_i = (F_{i-1} - F_{i-1}/A_i) \cup F_i/A_i$$

where "−" and "∪" are difference and union operators of sets, respectively. This process 400 is illustrated in FIG. 4A.

When the full-clone snapshot $F_{i-1}$ at the time instance i−1 is not available and the substantial write set $A'_{i+1}$ is not empty ($A'_{i+1} \neq \emptyset$), and $A'_{i+1} \subseteq A_i$, the ROW current snapshot cannot recover the full data set $F_i$ at the time instance i, as shown by the process 402 illustrated in FIG. 4B.

To address these issues associated with the prior snapshot and the current snapshot, the disclosed snapshot technique is designed to store an combination of the prior snapshot and the current snapshot at both the production site 102 and the backup site 104. The prior snapshot and the current snapshot are combined in such a way that the benefit of the prior snapshot (e.g., the ability to perform data recovery without the full-clone snapshot in the backup site 104) and the benefit of the current snapshot (e.g., the ability to perform data recovery without the current production data in the production site 102) are retained by the combination. The combination of the prior snapshot and the current snapshot is referred herein as a combined snapshot.

In some embodiments, the combination of the prior snapshot and the current snapshot can include a commutative binary operation. The commutative binary operator can be referenced herein as $\Delta$. The combination of the prior snapshot and the current snapshot can be represented as follows:

$$G_i(a) = F_{i-1}/A_i(a) \Delta F_i/A_i(a) \text{ for } a \in A_i$$

Because the binary operator $\Delta$ is commutative, there is an inversion binary operator $\nabla$ such that for any $d_1, d_2 \in D$, $d_1 \Delta d_2 \nabla d_2 = d_1$. Examples of the commutative binary operator $\Delta$ include a simple addition operator, an exclusive-OR (XOR) operator, or an inverse exclusive-OR (XOR) operator.

If $G_{i+1}(\alpha)$ for time instance i+1 is stored at both the production site 102 and the backup site 104, then the full data set $F_i$ at the time instance i can be recovered from the current data $F_{i+1}$ and $G_{i+1}$ when the backup site 104 is down (e.g., the full-clone snapshot $F_{i-1}$ is unavailable). Likewise, if $G_i(\alpha)$ for time instance i is stored at both the production site 102 and the backup site 104, then the full data set $F_i$ at the time instance i can be recovered from the full clone $F_{i-1}$ and $G_i$ when the production site 102 is down (e.g., the current production data $F_{i+1}$ is unavailable).

The intuition is that when the prior snapshot is needed to recover the full data set $F_i$ (e.g., when the backup site 104 is down), the combination snapshot $G_{i+1}(\alpha)$ of the time instance i+1, stored in the production site 102, can be decoded to recover the prior snapshot based on the current production data $F_{i+1}$ stored in the production site 102: $PS_{i+1}(\alpha) = G_{i+1}(\alpha) \nabla F_{i+1}/A_{i+1}(\alpha)$. Likewise, when the current snapshot is needed to recover the full data set $F_i$ (e.g., when the production site 102 is down), the combination snapshot $G_i(\alpha)$ of the time instance i, stored in the backup site 104, can be decoded to recover the current snapshot based on the current production data $F_{i-1}$, stored in the backup site 104: $CS_i(\alpha) = G_i(\alpha) \nabla F_{i-1}/A_i(\alpha)$. Therefore, regardless of whether the production site 102 is down or the backup site 104 is down, the memory controller 106 can use the combination snapshot G to recover the full data set $F_i$.

Referring to the data progression illustrated in FIG. 2A, as discussed earlier, the prior snapshots and current snapshots at time instances i and i+1 are as follows:

$$PS_i = \{a_0, b_0, d_0\}, PS_{i+1} = \{d_1, e_0\}$$

$$CS_i = \{a_1, b_1, d_1\}, CS_{i+1} = \{d_2, e_2\}$$

Since the combined snapshot is defined as $G_i(\alpha) = PS_i \Delta CS_i$, the combined snapshots at time instances i and i+1 are as follows:

$$G_i = \{a_0 \Delta a_1, b_0 \Delta b_1, d_0 \Delta d_1\}, G_{i+1} = \{d_1 \Delta d_2, e_0 \Delta e_2\}.$$

These combined snapshots can be stored in both the production site 102 and the backup site 104.

When the data recovery to the time instance i is desired and the backup site 104 is down, as in FIG. 3A, then the $F_{i+1}(\alpha)$ can be substituted with $G_{i+1}(\alpha) \nabla F_{i+1}/A_{i+1}(\alpha)$ to recover the full data $F_i$. Likewise, when the data recovery to the time instance i is desired and the production site 102 is down, as in FIG. 4A, then the $F_{i-1}(\alpha)$ can be substituted with $G_i(\alpha) \nabla F_{i-1}/A_i(\alpha)$ to recover the full data $F_i$.

Figure 6:
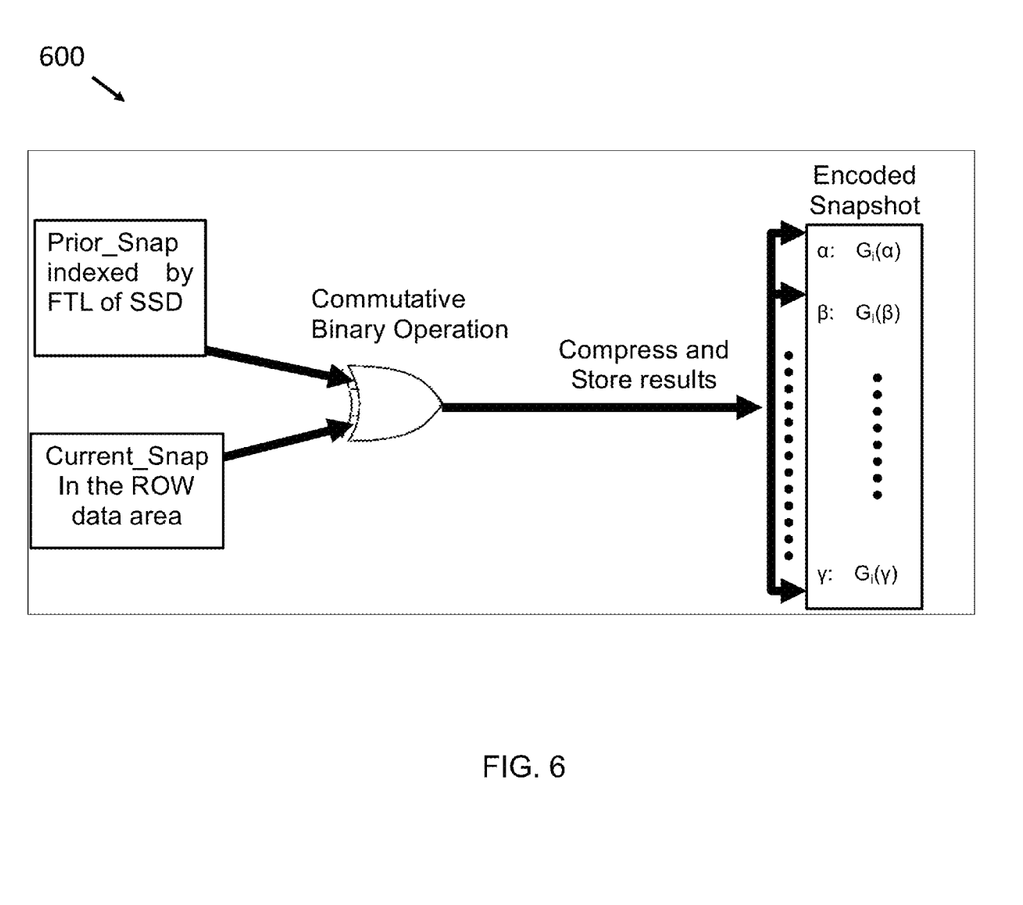
FIG. 6 illustrates a process for generating a combined snapshot in accordance with some embodiments.

In some embodiments, the memory controller 106 can be configured to compress the combined snapshot to further reduce the size of the combined snapshot. FIG. 6 illustrates a process 600 for generating a combined snapshot in accordance with some embodiments. The memory controller 106 can receive the prior snapshot that is indexed by the FTL of the SSD. The memory controller 106 can also receive the current snapshot from the storage device that maintains the ROW snapshot. Then the memory controller 106 can perform a commutative binary operation to generate combined snapshots. Subsequently, the memory controller 106 can compress the combined snapshots and store the compressed combined snapshots. In some embodiments, the memory controller 106 can generate the combined snapshots periodically. In other embodiments, the memory controller 106 can generate the combined snapshots whenever there is a change in data value. The memory controller 106 can be configured to store the combined snapshots at both the production site 102 and the backup site 104 whenever the combined snapshots are generated.

Figure 7:
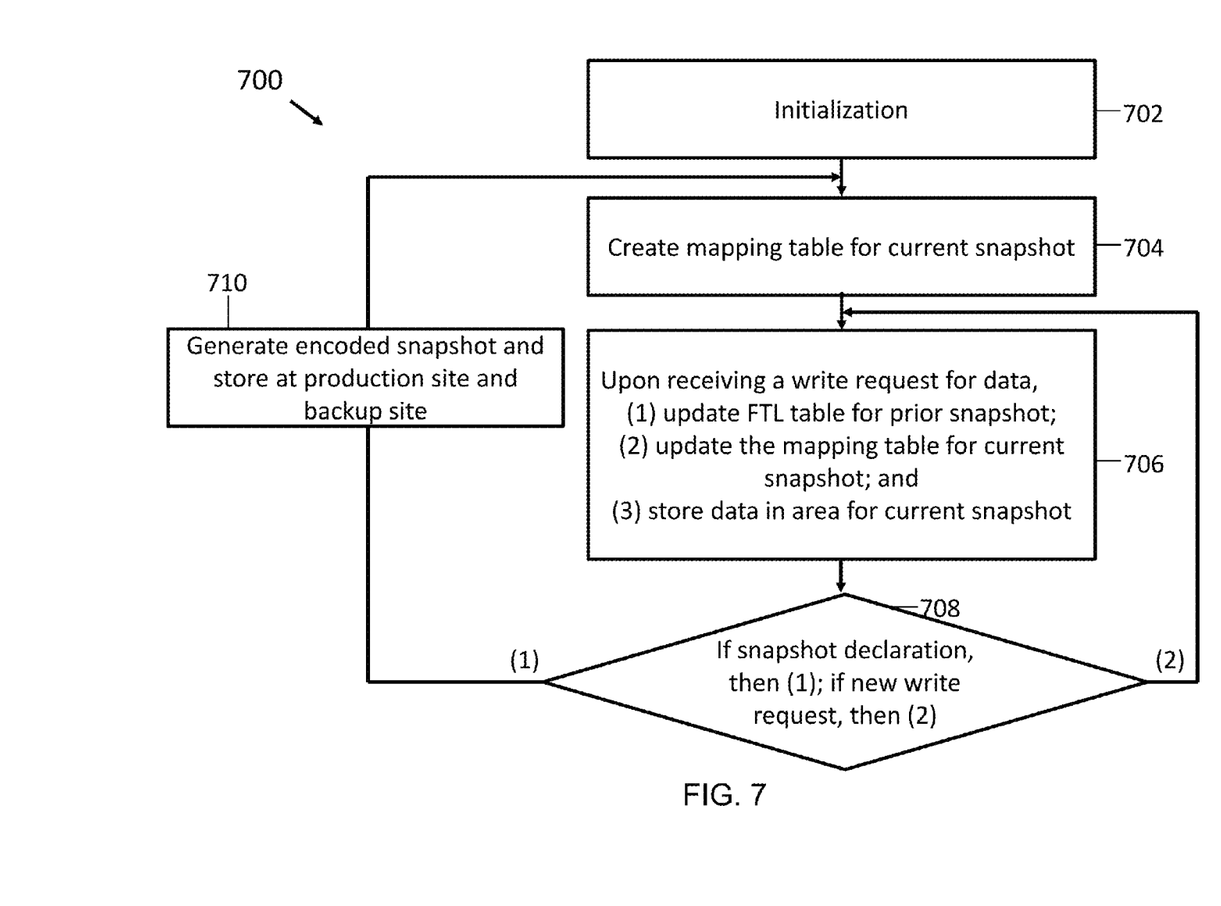
FIG. 7 shows how a memory controller provides combined snapshots for data recovery in accordance with some embodiments.

FIG. 7 shows a process 700 showing how a memory controller provides combined snapshots for data recovery in accordance with some embodiments. In step 702, the memory controller 106 is configured to initialize the SSD to accommodate the combined snapshot scheme. For example, the memory controller 106 is configured to augment the flash translation layer of SSDs with a time stamp and a one-byte name tag to identify snapshots. When the memory controller 106 is initialized and receives a declaration of a snapshot at a time instance i, then the memory controller 106 proceeds to step 704.

In step 704, the memory controller 106 can create a new mapping table for indexing a current snapshot in a new portion of a memory space. In some cases, the memory space can reside in a production storage device 108.

In step 706, when the memory controller 106 receives a write request to write new data to a particular memory block that already maintains prior data, the memory controller 106 can update the flash translation layer to index the prior data in the particular memory block. This way, the memory controller 106 can index the prior snapshot. Also, the memory controller 106 can write the new data in the memory space allocated to the current snapshot. Also, if the particular memory block was associated with the write request for the first time after the snapshot is last declared, then the memory controller 106 can update the new mapping table to index the current snapshot.

In step 708, the memory controller 106 determines whether a new write request is received or whether a new snapshot is declared. If a new write request is received, then the memory controller 106 re-executes step 706. If a new snapshot is declared, for example, at a time instance i+1, then the memory controller 106 moves to step 710. In some sense, the memory controller 106 executes step 706 every time the memory controller 106 receives a new write request, until a subsequent snapshot is declared.

In step 710, the memory controller 106 is configured to determine the combined snapshot. For example, the memory controller 106 can perform a commutative binary operation on the prior snapshot and the current snapshot to generate a combined snapshot. In some embodiments, the memory controller 106 can compress the combined snapshot. The compression ratio is expected to be high because, according to existing literature, less than 20% of data would be overwritten between snapshot declarations. Because of content locality that exists in most I/O access patterns (see, e.g., Jin Ren and Qing Yang "I-CASH: Intelligently Coupled Array of SSD and HDD" in *The 17th IEEE international Symposium on High Performance Computer Architecture*, 2011 (*HPCA '11*), San Antonio, Tex., February 2011 and Jin Ren and Qing Yang, "A New Buffer Cache Design Exploiting both Temporal and Content Localities," *The 30th International Conference on Distributed Computing Systems, ICDCS* 2010. Genoa, Italy, Jun. 21-25, 2010), the amount of bit changes in a page is typical small. As a result, when XORing prior snap with current snap, most of bits are 0's. A simple run-length encoding can compress the resulting page greatly reducing the storage footprint for storing the snapshot. Subsequently, the memory controller 106 can store the compressed combined snapshot in both the production site 102 and the backup site 104. Since the combined snapshot corresponds to the snapshot time instance i, the combined snapshot can be referred to as $G_i$.

Subsequently, steps 704-710 is repeated for the snapshot declared at the time instance i+1 to generate the combined snapshot $G_{i+1}$. This way, the memory controller 106 can generate combined snapshot sequence $G_i, G_{i+1}, \ldots G_N$ so that if the memory controller 106 is caused to recover production data associated with a particular time instance, the memory controller 106 can select an appropriate one of the combined snapshot sequences based on which one of the production site or the backup site is available, and use the selected combined snapshot to recover the production data associated with the particular time instance.

Where reference is made herein to a method comprising two or more defined steps, the defined steps can be carried out in any order or simultaneously (except where the context would indicate otherwise), and the method can include one or more other steps which are carried out before any of the defined steps, between two of the defined steps, or after all the defined steps (except where the context would indicate otherwise).

Those of skill in the art would appreciate that various illustrations described herein may be implemented as electronic hardware, computer software, firmware, or combinations of two or more of electronic hardware, computer software, and firmware. To illustrate this interchangeability of hardware, software, and/or firmware, various illustrative blocks, modules, elements, components, methods, and algorithms have been described above generally in terms of their functionality. Whether such functionality is implemented as hardware, software, firmware, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology. An implementation of the disclosed subject matter can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The disclosed subject matter can also be embedded in a computer program product, which comprises all the features enabling the implementation of the methods and systems described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A system comprising:
   one or more storage devices comprising a first memory block and a second memory block configured to maintain data, wherein the first memory block comprises a prior snapshot and the second memory block comprises a current snapshot of data stored in the first memory block;

an interface configured to provide communication with a remote storage device;

a memory controller in communication with the one or more storage devices and the interface, the memory controller configured to:
receive the prior snapshot and the current snapshot from the one or more storage devices;
perform a commutative binary operator on the prior snapshot and the current snapshot to generate a combined snapshot; and
cause the combined snapshot to be stored in the one or more storage devices and the remote storage device, wherein the combined snapshot can be used to recover any lost data when the one or more storage devices or the remote storage device is inoperative;

wherein the remote storage device configured to maintain a full-clone snapshot of the one or more storage devices for a first time instance, a first combined snapshot of a second time instance, and a second combined snapshot of a third time instance, wherein the one or more storage devices is configured to maintain data associated with the third time instance, the first combined snapshot of the second time instance, and the second combined snapshot of the third time instance; and wherein the memory controller is caused to recover data for the second time instance when the remote storage device is inoperative, the memory controller being configured to:
retrieve the second combined snapshot of the third time instance from the one or more storage devices, wherein the second combined snapshot is indicative of at least one memory block that has changed value between the second time instance and the third time instance;
perform an inverse commutative binary operator on the second combined snapshot of the third time instance and the at least one memory block of the data associated with the third time instance to recover a prior snapshot of the third time instance; and
substitute the at least one memory block of the data based on the prior snapshot of the third time instance to recover the data for the second time instance.

2. The system of claim 1, wherein the commutative binary operator comprises an exclusive OR operator.

3. The system of claim 1, wherein the memory controller is configured to index the prior snapshot using a flash translation layer that associates a logical block address and a physical memory location.

4. The system of claim 1, wherein the memory controller is configured to index the current snapshot using a mapping table.

5. The system of claim 1, wherein the one or more storage devices comprises flash memory and the one or more storage devices are arranged in a redundant array configuration.

6. The system of claim 1, wherein the remote storage device resides in a data center and the memory controller is configured to communicate with the remote storage device using the interface over the Internet.

7. A system comprising:
one or more storage devices comprising a first memory block and a second memory block configured to maintain data, wherein the first memory block comprises a prior snapshot and the second memory block comprises a current snapshot of data stored in the first memory block;

an interface configured to provide communication with a remote storage device;

a memory controller in communication with the one or more storage devices and the interface, the memory controller configured to:
receive the prior snapshot and the current snapshot from the one or more storage devices;
perform a commutative binary operator on the prior snapshot and the current snapshot to generate a combined snapshot; and
cause the combined snapshot to be stored in the one or more storage devices and the remote storage device, wherein the combined snapshot can be used to recover any lost data when the one or more storage devices or the remote storage device is inoperative;

wherein the remote storage device configured to maintain a full-clone snapshot of the one or more storage devices for a first time instance, a first combined snapshot of a second time instance, and a second combined snapshot of a third time instance, wherein the one or more storage devices is configured to maintain data associated with the third time instance, the first combined snapshot of the second time instance, and the second combined snapshot of the third time instance; and wherein the memory controller is caused to recover data for the second time instance when the one or more storage devices is inoperative, the memory controller being configured to:
retrieve the first combined snapshot of the second time instance and the full-clone snapshot of the first time instance from the remote storage device, wherein the combined snapshot is indicative of at least one memory block that has changed value between the first time instance and the second time instance;
perform an inverse commutative binary operator on the combined snapshot of the first time instance and the at least one memory block of the full-clone snapshot of the first time instance to recover a current snapshot of the second time instance; and
substitute the at least one memory block of the full-clone snapshot of the first time instance based on the current snapshot of the second time instance to recover the data for the second time instance.

8. A method comprising:
receiving, by a memory controller, a prior snapshot of a first memory block and a current snapshot of the first memory block;
performing, by the memory controller, a commutative binary operator on the prior snapshot and the current snapshot to generate a combined snapshot;
causing, by the memory controller, the combined snapshot to be stored in a one or more storage devices and a remote storage device, wherein the combined snapshot can be used to recover any lost data when the one or more storage devices or the remote storage device is inoperative;
maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance;

retrieving the second combined snapshot of the third time instance from the one or more storage devices, wherein the second combined snapshot is indicative of at least one memory block that has changed value between the second time instance and the third time instance;

operating an inverse commutative binary operator on the second combined snapshot of the third time instance and the at least one memory block of the data for the third time instance to recover a prior snapshot of the third time instance; and substituting the at least one memory block of the data for the third time instance based on the prior snapshot of the third time instance to recover the data for the second time instance.

9. The method of claim 8, wherein the commutative binary operator comprises an exclusive OR operator.

10. The method of claim 8, comprising indexing the prior snapshot using a flash translation layer that associates a logical block address and a physical memory location.

11. The method of claim 8, comprising indexing the current snapshot using a mapping table.

12. The method of claim 8, wherein the remote storage device resides in a data center and the memory controller is configured to communicate with the remote storage device using the interface over the Internet.

13. A method comprising:

receiving, by a memory controller, a prior snapshot of a first memory block and a current snapshot of the first memory block;

performing, by the memory controller, a commutative binary operator on the prior snapshot and the current snapshot to generate a combined snapshot;

causing, by the memory controller, the combined snapshot to be stored in a one or more storage devices and a remote storage device, wherein the combined snapshot can be used to recover any lost data when the one or more storage devices or the remote storage device is inoperative;

maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance;

retrieving the first combined snapshot of the second time instance and the full-clone snapshot of the first time instance from the remote storage device, wherein the first combined snapshot is indicative of at least one memory block that has changed value between the first time instance and the second time instance;

operating an inverse commutative binary operator on the combined snapshot of the first time instance and the at least one memory block of the full-clone snapshot of the first time instance to recover a current snapshot of the second time instance; and substituting the at least one memory block of the full-clone snapshot of the first time instance based on the current snapshot of the second time instance to recover the data for the second time instance.

14. A non-transitory computer readable medium storing a series of instructions executable on a computer, the non-transitory computer readable medium implementing the steps of:

receiving, by a memory controller, a prior snapshot of a first memory block and a current snapshot of the first memory block;

performing, by the memory controller, a commutative binary operator on the prior snapshot and the current snapshot to generate a combined snapshot;

causing, by the memory controller, the combined snapshot to be stored in one or more storage devices and a remote storage device, wherein the combined snapshot can be used to recover any lost data when the one or more storage devices or the remote storage device is inoperative;

maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance;

retrieving the second combined snapshot of the third time instance from the one or more storage devices, wherein the second combined snapshot is indicative of at least one memory block that has changed value between the second time instance and the third time instance;

operating an inverse commutative binary operator on the second combined snapshot of the third time instance and the at least one memory block of the data for the third time instance to recover a prior snapshot of the third time instance; and substituting the at least one memory block of the data for the third time instance based on the prior snapshot of the third time instance to recover the data for the second time instance.

15. The medium of claim 14, wherein the commutative binary operator comprises an exclusive OR operator.

16. The medium of claim 14, wherein the memory controller is configured to index the prior snapshot using a flash translation layer that associates a logical block address and a physical memory location.

17. The medium of claim 14, wherein the memory controller is configured to index the current snapshot using a mapping table.

18. The medium of claim 14, wherein the one or more storage devices comprises flash memory and the one or more storage devices are arranged in a redundant array configuration.

19. The medium of claim 14, wherein the remote storage device resides in a data center and the memory controller is configured to communicate with the remote storage device using the interface over the Internet.

20. A non-transitory computer readable medium storing a series of instructions executable on a computer, the non-transitory computer readable medium implementing the steps of:

receiving, by a memory controller, a prior snapshot of a first memory block and a current snapshot of the first memory block;

performing, by the memory controller, a commutative binary operator on the prior snapshot and the current snapshot to generate a combined snapshot;

causing, by the memory controller, the combined snapshot to be stored in one or more storage devices and a remote storage device, wherein the combined snapshot can be used to recover any lost data when the one or more storage devices or the remote storage device is inoperative;

maintaining a full-clone snapshot of the one or more storage devices for a first time instance, a first combined snapshot of a second time instance, and a second combined snapshot of a third time instance, and maintaining data for the third time instance, the first combined snapshot of the second time instance, and the second combined snapshot of the third time instance;

retrieving the combined snapshot of the first time instance and the full-clone snapshot of the first time instance from the remote storage device, wherein the combined snapshot is indicative of at least one memory block that has changed value between the first time instance and the second time instance;

operating an inverse commutative binary operator on the combined snapshot of the first time instance and the at least one memory block of the full-clone snapshot of the first time instance to recover a current snapshot of the second time instance; and substituting the at least one memory block of the full-clone snapshot of the first time instance based on the current snapshot of the second time instance to recover the data for the second time instance.

\* \* \* \* \*